G. W. DUNN.
Water-Wheel Gate.
No. 163,754. Patented May 25, 1875.
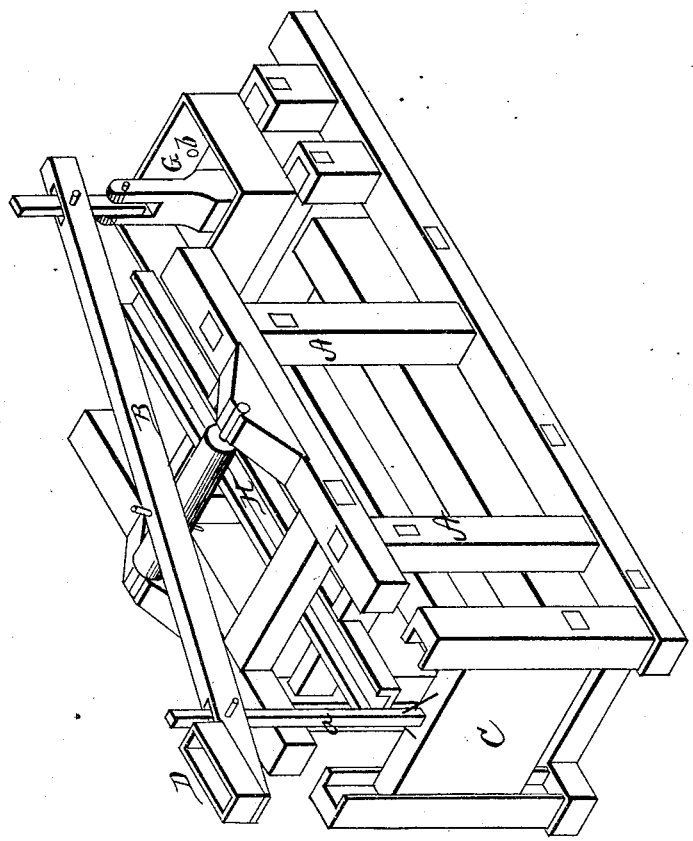
WITNESSES
Chas H Durand
C. L. Everk
INVENTOR
George W. Dunn
per Alexander Mason
ATTORNEY
THE GRAPHIC CO. PHOTO-LITH. 39 & 41 PARK PLACE, N.Y.

UNITED STATES PATENT OFFICE.

GEORGE W. DUNN, OF TEXAS CREEK, COLORADO TERRITORY.

IMPROVEMENT IN WATER-WHEEL GATES.

Specification forming part of Letters Patent No. 163,754, dated May 25, 1875; application filed March 6, 1875.

*To all whom it may concern:*

Be it known that I, GEORGE W. DUNN, of Texas Creek, in the county of Fremont and in the Territory of Colorado, have invented certain new and useful Improvements in Water-Gate; and do hereby declare that the following is a full, clear, and exact description thereof, reference being had to the accompanying drawings and to the letters of reference marked thereon, making a part of this specification.

The nature of my invention consists in the construction and arrangement of a self-acting water-gate for mining purposes, as will be hereinafter more fully set forth.

In order to enable others skilled in the art to which my invention appertains to make and use the same, I will now proceed to describe its construction and operation, referring to the annexed drawing, which represents a perspective view of my invention.

A represents a suitable frame-work erected below any water-reservoir, and having a walking-beam or lever, B, suitably journaled in its upper part. C represents the gate for the reservoir, connected by a rod or bar, $a$, with the inner end of the lever B, said end of the lever being provided with a box, D, for the reception of weights to bear down this end of the lever and gate. From the other end of the lever B is suspended a box, G, as shown. H represents a trough arranged in such a manner that when the water rises in the reservoir above the gate C it will pass through this trough and fill the box G so that the box will overbalance the weighted end of the lever and raise the gate, allowing a portion of the water to pass out through the same. As soon as the water in the reservoir falls low enough that no more will go through the trough H the water in the box G will pass out through an aperture, $b$, therein. The weighted end of the lever, then overbalancing the box, will close the gate C. In like manner, every time the water rises above the water-line the gate will open, and as soon as it falls below the gate will close.

Having thus fully described my invention, what I claim as new, and desire to secure by Letters Patent, is—

The combination of the gate C, connecting-rod $a$, lever or walking-beam B, with weight-box D, the box G, with outlet $b$, and the trough H, all constructed and arranged substantially as and for the purposes herein set forth.

In testimony that I claim the foregoing I have hereunto set my hand this 15th day of April, 1874.

GEORGE W. DUNN.

Witnesses:
L. D. HUBBELL,
JAS. M. RILAND.